United States Patent
Hattori et al.

(10) Patent No.: US 6,906,444 B2
(45) Date of Patent: Jun. 14, 2005

(54) PERMANENT MAGNET MOTOR

(75) Inventors: Masakazu Hattori, Gifu (JP); Naohiro Makino, Gifu (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 10/192,302

(22) Filed: Jul. 9, 2002

(65) Prior Publication Data

US 2003/0011265 A1 Jan. 16, 2003

(30) Foreign Application Priority Data

Jul. 10, 2001 (JP) .................................... P2001-208877

(51) Int. Cl.[7] ............................................. H02K 21/12
(52) U.S. Cl. ............................. 310/156.53; 310/156.31
(58) Field of Search ....................... 310/156.28, 156.31, 310/156.48–156.56

(56) References Cited

U.S. PATENT DOCUMENTS

| | | | | |
|---|---|---|---|---|
| 2,062,938 A | * | 12/1936 | Ruppe ........................ | 310/254 |
| 4,296,544 A | * | 10/1981 | Burgmeier et al. ........... | 29/598 |
| 4,322,648 A | * | 3/1982 | Ray et al. ................ | 310/156.55 |
| 4,332,079 A | * | 6/1982 | Silver ......................... | 29/598 |
| 4,339,874 A | * | 7/1982 | Mc'Carty et al. ............. | 29/598 |
| 4,433,261 A | * | 2/1984 | Nashiki et al. ......... | 310/156.28 |
| 4,625,135 A | * | 11/1986 | Kasabian ............... | 310/156.28 |
| 5,191,256 A | * | 3/1993 | Reiter et al. ........... | 310/156.49 |
| 5,508,576 A | * | 4/1996 | Nagate et al. .......... | 310/156.54 |
| 5,945,760 A | * | 8/1999 | Honda et al. ........... | 310/156.53 |
| 6,225,724 B1 | * | 5/2001 | Toide et al. ................. | 310/216 |
| 6,441,524 B2 | * | 8/2002 | Kaneko et al. ......... | 310/156.45 |

* cited by examiner

*Primary Examiner*—Tran Nguyen
(74) *Attorney, Agent, or Firm*—Akin Gump Strauss Hauer & Feld, LLP

(57) ABSTRACT

Each permanent magnet formed in an open-letter shape is divided into a plurality of parts, the divided magnets are respectively fitted in open letter-shaped inserting portions, and ribs are respectively provided in dividing portions of the permanent magnets. Accordingly, it is possible to prevent the breakage of pole connecting portions at an outermost periphery of the rotor as adjacent inner peripheral-side permanent magnets directly come into contact with and push the outer peripheral-side permanent magnets. Alternatively, an annular nonmagnetic material is provided on an outer peripheral portion of the rotor so as to cover the open letter-shaped permanent magnets and magnetic material portions inside the open-letter portions, whereby the rotor core is made resistant against breakage, and the flux leakage is minimized.

14 Claims, 5 Drawing Sheets

PRIOR ART

PERMANENT MAGNET MOTOR

BACKGROUND OF THE INVENTION

The present invention relates to a permanent magnet-embedded rotor-type motor.

In recent years, various motors have come to be developed, but the application of permanent magnet motors has been carried out extensively because of the high energy density and efficiency. Further, the development of embedded magnet-type motors, in which permanent magnets arranged in a rotor are embedded in a core, is underway. The embedded magnet-type motor realizes a high torque since permanent magnets are effectively arranged in the core to provide saliency in a magnetic circuit in the rotor, but it has been thought that the leakage of the magnetic flux to outer peripheral rib portions is unavoidable for the reason of mechanical strength. The outer peripheral ribs must be made thin to reduce the leakage of the magnetic flux. On the other hand, however, to effect high-speed rotation, it is necessary to secure mechanical strength by making the outer peripheral ribs thick. The above-described conflicting characteristics have been detrimental to the realization of higher-speed, higher-torque motors.

A related-art open trapezoidal shaped rotor is shown in FIG. 8. Reference numeral 1 denotes a stator core formed in a hollow cylindrical shape, and slots 2 are punched on its inner side in a number determined by such as the number of poles and the number of phases, coils 3 being wound between the slots 2. Numeral 4 denotes a cylindrical rotor core disposed on the inner side of the aforementioned stator core 1, and open trapezoidal shaped magnet insertion holes 5 which extend through in the axial direction are formed in it.

Reference numeral 6 denotes a magnetic-flux holding portion which is located in an outer peripheral portion of the rotor core 4 and is sandwiched by inner edges of the open trapezoidal shaped magnet insertion hole 5. Numeral 7 denotes a yoke portion surrounded by outer edges of adjacent ones of the open trapezoidal shaped magnet insertion holes 5. Numeral 8 denotes a connecting portion for connecting the magnetic-flux holding portion 6 and the yoke portion 7 and disposed on the outer side of the magnet insertion hole 5 adjacent thereto. The connecting portion 8 has a width necessary for securing the strength.

Reference numeral 9 denotes a permanent magnet inserted in the magnet insertion hole 5. The permanent magnets 9 are embedded in the open U-shape which is symmetrical with the magnet insertion hole 5 and divided into three parts, and form one magnetic pole. Further, polarities of the permanent magnets 9 of adjacent poles a rearranged to be of opposite polarities. Reference numeral 10 denotes a rotor-shaft inserting hole.

The related-art rotor of the open trapezoidal type is constructed as described above, and assuming that the coils 3 are three-phase windings, if a three-phase alternating current is allowed to flow across the coils 3, the rotor core 4 rotates as there occur the torque occurring due to the current flowing across the coils 3 and the magnetic flux of the permanent magnets 9, i.e., the permanent magnet field torque, as well as the torque in which the magnetic flux occurring due to the current flowing across the coils 3 tends to move to a magnetically stable position, i.e.; the reluctance torque. Namely, the construction is such that the magnetic flux due to the permanent magnets 9 is related to the torque generated by the motor.

With the open trapezoidal-type rotor of such a related-art permanent magnet motor, since the divided permanent magnets 9 are embedded, the centrifugal force acting in the permanent magnets and the centrifugal force acting in the magnetic-flux holding portions 6 surrounded by the magnets of the open trapezoidal type are concentrated in the connecting portions 8 of the rotor core. For this reason, the radial width of each connecting portion 8 must be relatively large in order to maintain the strength.

Accordingly, since the radial width of each connecting portion is relatively large, the leakage flux occurring in the connecting portions 8 increases, so that the magnetic flux which is interlinked with the coils decreases. Hence, there occurs the problem that the energy density of the motor declines.

For this reason, if the magnets at both outer peripheral portions of the open trapezoidal portion are made long by sacrificing the strength so as to increase the magnetic flux in the open trapezoidal portion, the number of revolution can be set to only 6000 rpm or thereabouts so as to maintain the centrifugal force within a range in which the radial portions of the connecting portions 8 are not broken. Hence, it has been impossible to realize an embedded magnet-type motor capable of high-speed rotation and high-torque at same time.

SUMMARY OF THE INVENTION

The invention has been devised to over come the above-described problems, and its object is to provide a permanent magnet motor which makes it possible to reduce the leakage flux between adjacent pole portions while the strength necessary for the rotor core is still being held.

The permanent magnet motor in accordance with the invention is a permanent magnet motor in which a rotor formed by a single steel member or by laminating a multiplicity of steel plates is disposed on an inner side of a stator core around which coils are wound, magnet insertion holes are formed in an open-letter shape in the rotor in such a manner as to extend in an axial direction of the rotor such that an open side of each open-letter portion is disposed on an outer peripheral side of the rotor core, and permanent magnets are respectively inserted in the magnet insertion holes such that inner sides of the open-letter portions respectively assume same polarities, wherein each of the permanent magnets formed in the open-letter shape is divided into a plurality of parts, the divided magnets are respectively fitted in open letter-shaped inserting portions, and ribs are respectively provided in dividing portions of the permanent magnets. Accordingly, there is an advantage in that it is possible to prevent the breakage of pole connecting portions at an outermost periphery of the rotor as adjacent inner peripheral-side permanent magnets directly come into contact with and push the outer peripheral-side permanent magnets.

The open-letter shape used in this specification generally means a predetermined shape having separated ends, such as an open trapezoidal shape, a V-shape, a U-shape, an arcuate shape, etc.

In addition, as a result of the adoption of the above-described construction, since it is possible to reduce the force applied to the pole connecting portions at the outer periphery of the rotor from the permanent magnets, it is possible to narrow the width of the pole connecting portions at the outer periphery of the rotor. As a result, it is possible to suppress the magnetic field escaping from the pole connecting portion at the outer periphery of the rotor to outside the open-letter portion. Thus it is possible to obtain a large torque as compared with the related-art products. In addition, a method can be adopted in which since the centrifugal force applied to the pole connecting portions at the outer periphery of the rotor is reduced, the size of each magnet can be made large, so that the magnetic flux in the open-letter portion can be increased to obtain a large torque.

Furthermore, although the related-art rotor is able to obtain a number of revolution of only 6000 rpm or thereabouts because the pole connecting portions at the outer periphery of the rotor are weak, the centrifugal force applied to the pole connecting portions from the permanent magnets is weakened by the provision of the rib portions. Accordingly, it is possible to fabricate an embedded magnet-type motor which is capable of withstanding even the high-speed rotation of 10,000 rpm or higher.

In addition, the outer peripheral portion of the rotor is covered by a highly rigid annular nonmagnetic material, and the open letter-shaped permanent magnets are fitted in the rotor in such a manner as to come into close contact with the highly rigid annular nonmagnetic material. The adoption of this construction makes it possible to suppress the leakage of the magnetic field due to the magnetic material constituting the rotor and to make large the magnetic flux density inside the open-letter portion, thereby making it possible to obtain a large torque. In addition, since the outer peripheral portion of the rotor is covered by the annular nonmagnetic material, the annular nonmagnetic material at the outer periphery of the rotor is able to withstand the centrifugal force of the open letter-shaped permanent magnets and the magnetic material portions inside the open-letter portions. Hence, a method can be adopted in which the size of the permanent magnets can be made large, and the magnetic flux density inside the open-letter portions is thereby increased so as to increase the torque.

Since the annular nonmagnetic material is disposed in the outer peripheral portion of the rotor, the annular nonmagnetic material is able to withstand breakage due to the centrifugal force of the open letter-shaped permanent magnets and the magnetic material portions inside the open-letter portions. Therefore, it is possible to provide an embedded magnet-type motor which can be used even at a number of revolution which has hitherto not been possible to use.

The present disclosure relates to the subject matter contained in Japanese patent application No. 2001-208877 (filed on Jul. 10, 2001), which is expressly incorporated herein by reference in its entirety.

DESCRIPTION OF THE PREFERRED EMBODIMENT

[First Embodiment]

Figure 1:
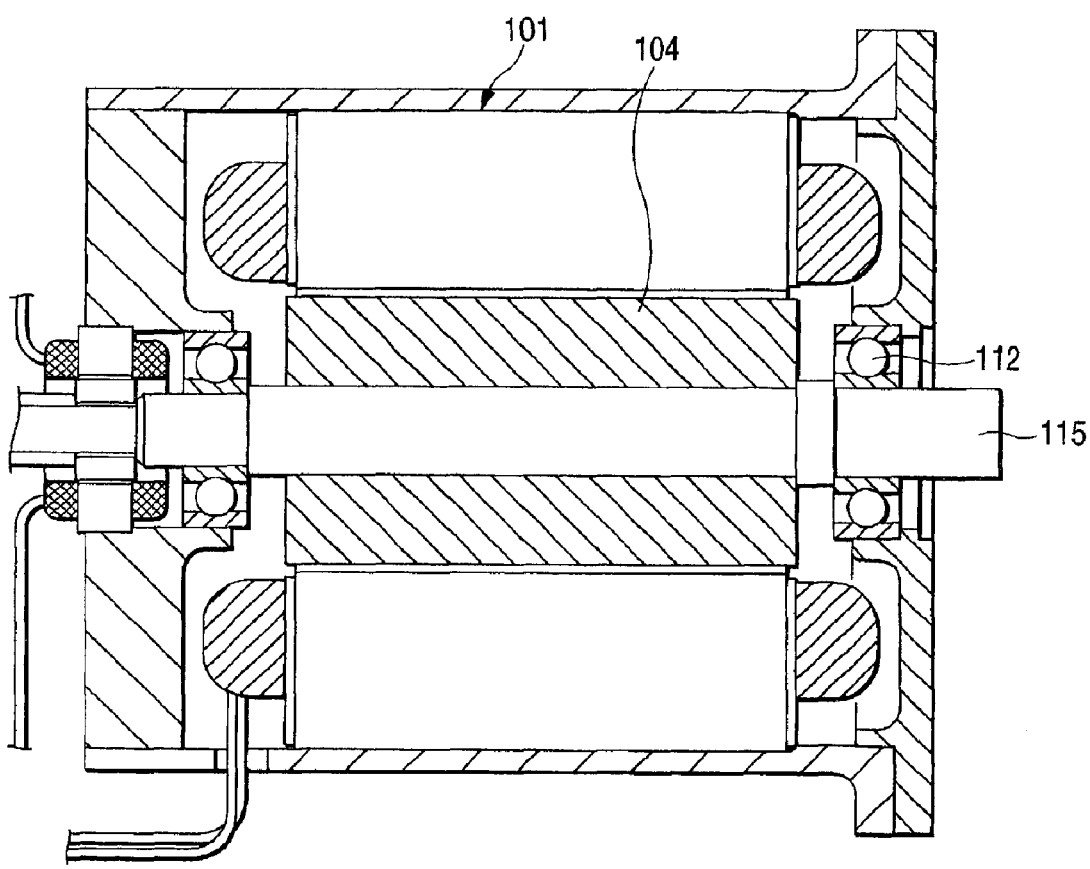
FIG. 1 is a sectional view of a permanent magnet motor in accordance with a first embodiment of the invention.
Figure 2:
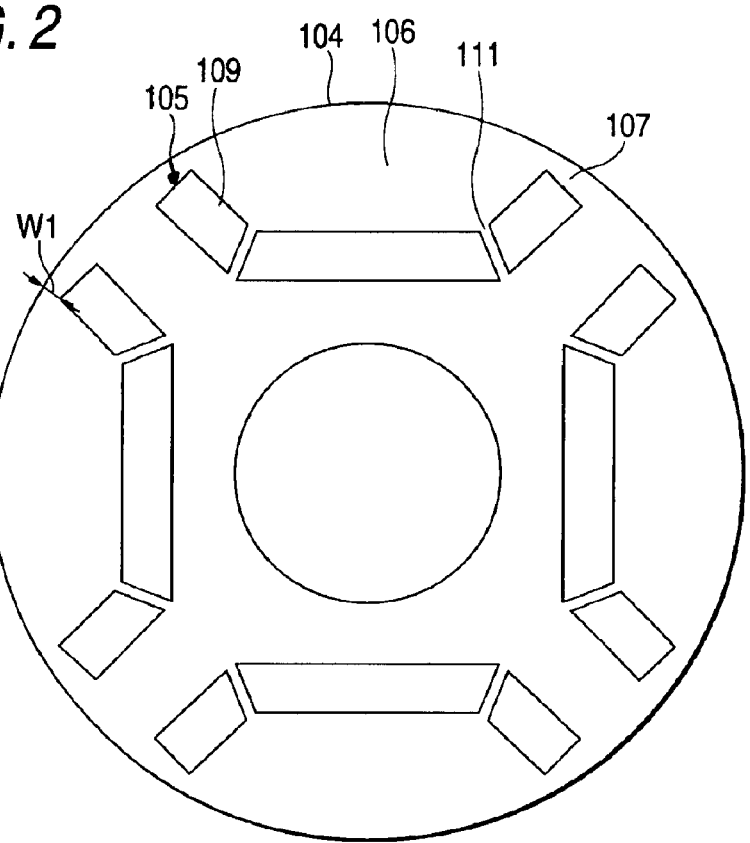
FIG. 2 is a cross-sectional view of the rotor core illustrating the permanent magnet motor in accordance with the first embodiment of the invention (open trapezoidal shaped type)

FIG. 1 is a sectional view illustrating a permanent magnet motor in accordance with a first embodiment of the invention. FIG. 2 is a cross-sectional view of a rotor core shown in FIG. 1. In FIG. 1, a rotor core 104 is disposed inside a stator core 101, and a motor output shaft 115, which rotates with the rotor core at the central axis of rotation of the rotor core, is fixed to the stator core by means of a bearing 112. In FIGS. 1 and 2, reference numeral 104 denotes the rotor core which is formed in a cylindrical shape by a single steel member or by laminating a multiplicity of punched steel plates. The rotor core 104 has a plurality of open trapezoidal shaped magnet insertion holes 105, and is provided with permanent magnets 109 which are inserted in the magnet insertion holes 105. Numeral 111 denotes a rib portion which prevents the centrifugal force acting in the permanent magnets 109 and a magnetic-flux holding portion 106 from being concentrated in an outer peripheral connecting portion 107. In contrast to the fact that the load applied to the outer peripheral connecting portion 107 is a bending load, the load applied to the rib portion 111 is close to that of simple tension, so that even if the size of an equal measure is allotted to the rib portion 111, it is possible to cope with a stronger load.

Accordingly, even if the width W1 of the outer peripheral connecting portion 107 is narrowed, the outer peripheral connecting portion 107 is not broken by the provision of the rib portion 111.

On the other hand, although the leakage of the magnetic flux occurs in both the outer peripheral connecting portion 107 and the inner rib portion 111 due to the provision of the rib portion 111, the width W1 of the outer peripheral connecting portion 107 can be kept to a remarkably small size thanks to the provision of the inner rib portion 111, as described above. Consequently, the paths of leakage of the magnetic flux can be reduced as compared with the case where only the outer peripheral connecting portions 107 are relied upon.

By suppressing the leakage flux while the mechanical strength is maintained overall, it is possible to make large the magnetic flux density in the magnetic-flux holding portion 106 and increase the rotational torque of the rotor. Further, since it is possible to alleviate the force based on the centrifugal force applied to the outer peripheral connecting portion 107 of the rotor from the permanent magnet, it is possible to increase the size of the permanent magnet 109 to make large the magnetic flux density in the magnetic-flux holding portion 106, thereby making it possible to increase the torque.

In addition, the fact that it is possible to alleviate the force based on the centrifugal force applied to the outer peripheral connecting portion 107 of the rotor from the permanent magnet means that even if the rotor is rotated at a high speed in comparison with the number of revolution of the related-art rotor, it is possible to operate the motor while maintaining the same reliability as in the related-art case.

[Second Embodiment]

Figure 3:
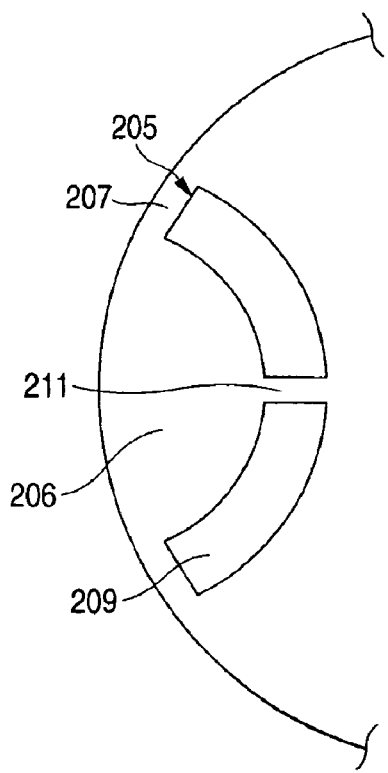
FIG. 3 is a cross-sectional view of the rotor core illustrating the permanent magnet motor in accordance with a second embodiment of the invention (open U-shaped type)

As shown in FIG. 3, the invention is also applicable to a U-shaped permanent magnet-embedded type rotor as another form in which the rib portions are provided. As shown in FIG. 3, the U-shaped magnet is divided into two parts, which are inserted in magnet embedding grooves 205 of the rotor. As the permanent magnet is thus divided into two parts by providing a rib portion 211, there is an advantage in that the load due to the centrifugal force of permanent magnets 209 and a magnetic-flux holding portion 206 is prevented from being concentrated in a rotor connecting portion 207. As a result, advantages similar to those of the first embodiment can be offered.

[Third Embodiment]

Figure 4:
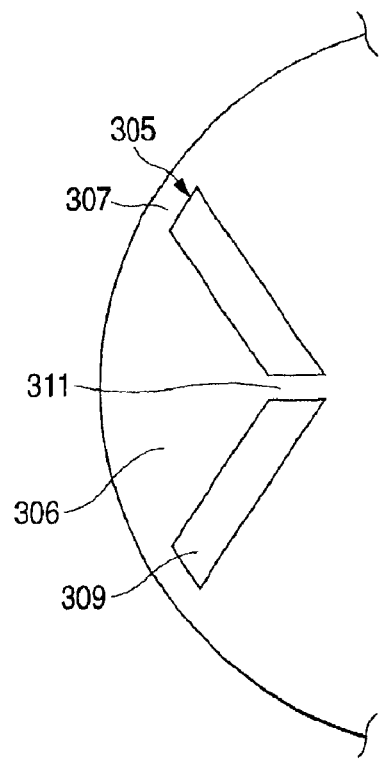
FIG. 4 is a cross-sectional view of the rotor core illustrating the permanent magnet motor in accordance with a third embodiment of the invention (open V-shaped type)

As shown in FIG. 4, there is a V-shaped permanent magnet-embedded rotor as still another embodiment. As shown in FIG. 4, the V-shaped permanent magnet is divided into two parts, which are inserted in magnet embedding grooves 305 of the rotor. As the permanent magnet is thus divided into two parts by providing a rib portion 311, there is an advantage in that the load due to the centrifugal force of permanent magnets 309 and a magnetic-flux holding portion 306 is prevented from being concentrated in a rotor connecting portion 307 in the same way as the rotor using the U-shaped permanent magnets. As a result, advantages similar to those of the open trapezoidal shaped permanent magnet-embedded rotor in accordance with the first embodiment can be offered.

The forms of the permanent magnets are not limited to the open trapezoidal shaped, open U-shaped, and V-shaped forms of the above-described first, second, and third embodiments, it is possible to obtain similar advantages by dividing permanent magnets of various shapes of the permanent magnet-type rotor and by forming ribs in dividing portions.

[Fourth Embodiment]

Figure 5:
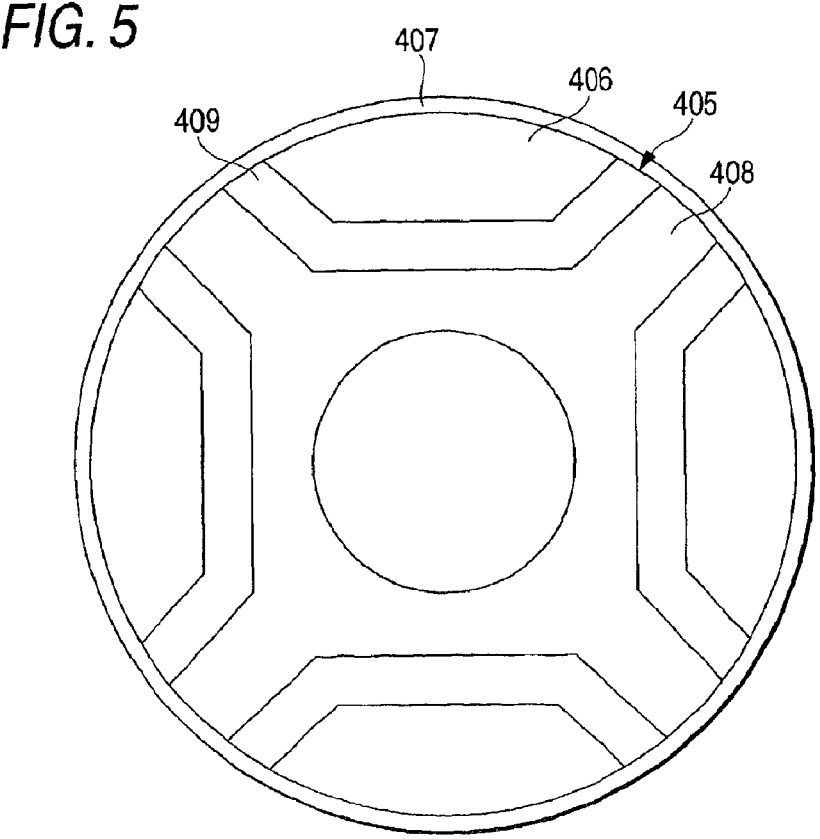
FIG. 5 is a cross-sectional view of the rotor core illustrating the permanent magnet motor in accordance with a fourth embodiment of the invention (open trapezoidal shaped type)

FIG. 5 is a sectional view of a permanent magnet-type rotor illustrating a fourth embodiment of the invention. This rotor is constructed such that a core portion 408, an open trapezoidal shaped magnet portion 405, and a magnetic-field holding magnetic substance portion 406 inside the open trapezoidal shaped portion are covered by an annular nonmagnetic material 407. As the outer peripheral portion is covered by the nonmagnetic material 407, and the open trapezoidal shaped magnet is disposed so as to come into contact with the annular nonmagnetic material 407 as shown in FIG. 5, the magnetic flux leaking from inside the magnetic-field holding magnetic substance portion 406 is practically nil, thereby making it possible to obtain a large magnetic flux density. Further, as the outer peripheral portion is covered by the annular nonmagnetic material 407, the structure is able to resist the breakage of the rotor due to the centrifugal force of an open trapezoidal shaped permanent magnet 409 and the magnetic-field holding magnetic substance portion 406 inside the open trapezoidal shaped portion. Accordingly, there are advantages in that the magnetic flux density in the magnetic-field holding magnetic substance portion 406 can be made large by using a large permanent magnet, and that it is possible to fabricate an embedded magnet-type motor which is capable of withstanding even such a range of high-speed rotation that the rotor would become broken in the related-art arrangement.

As for these advantages, if components having greater permeability are used as the magnetic-field holding magnetic substances 406, it is possible to obtain even greater advantages.

The material of the annular nonmagnetic material 407 is not limited to a nonmagnetic material, and by selecting a material having high rigidity, it is possible to make large the magnetic flux density of the magnetic-field holding magnetic substance 406 inside the open trapezoidal shaped portion by using large magnets, and to operate the embedded magnet-type motor in a higher rotation region.

[Fifth Embodiment]

Figure 6:
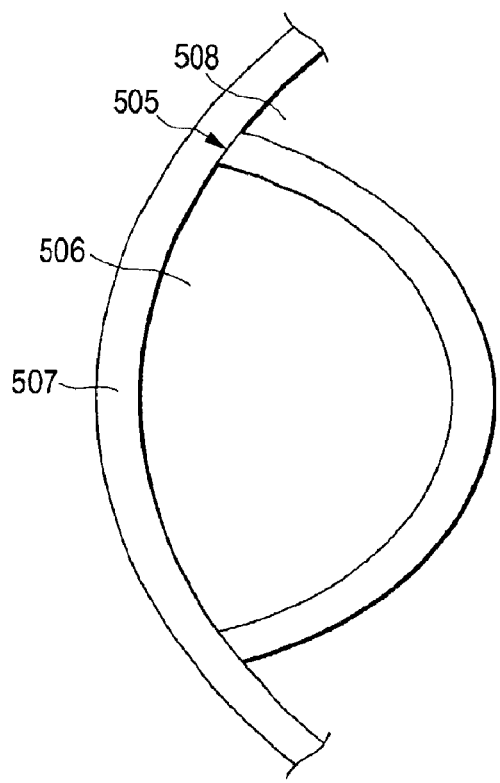
FIG. 6 is a cross-sectional view of the rotor core illustrating the permanent magnet motor in accordance with a fifth embodiment of the invention (open U-shaped type)

In addition, if the shape of the open trapezoidal shaped permanent magnet in accordance with the fourth embodiment is formed in a U-shape as shown in FIG. 6, it is possible to obtain advantages similar to those of the fourth embodiment. This rotor is constructed such that a core portion 508, a U-shaped magnet portion 505, and a magnetic-field holding magnetic substance portion 506 inside the U-shaped portion are covered by an annular nonmagnetic material 507.

[Sixth Embodiment]

Figure 7:
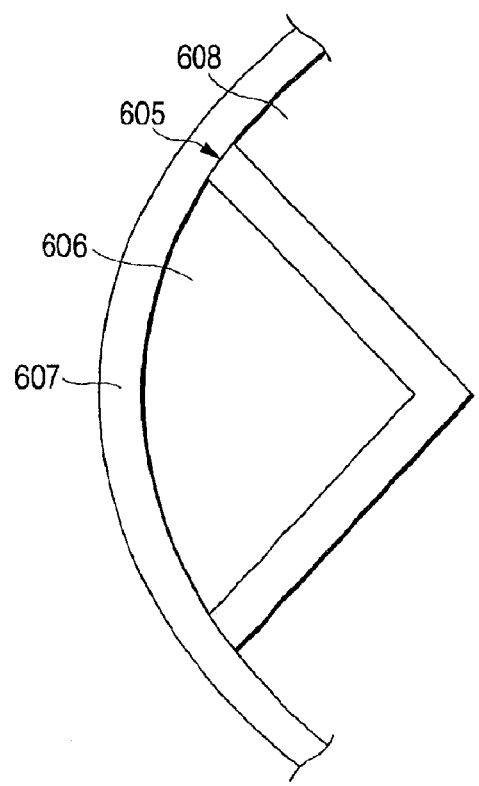
FIG. 7 is a cross-sectional view of the rotor core illustrating the permanent magnet motor in accordance with a sixth embodiment of the invention (open V-shaped type)
Figure 8:
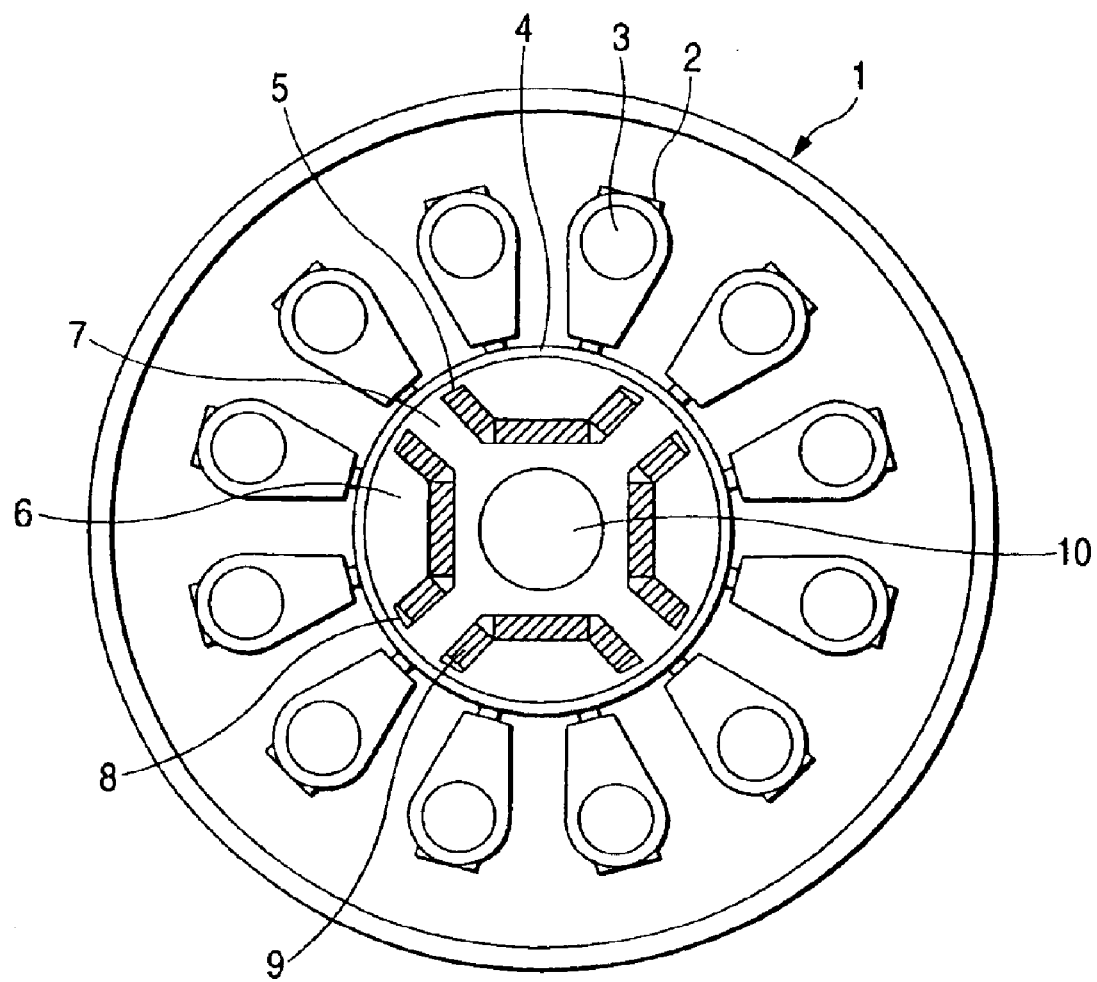
FIG. 8 is a schematic diagram illustrating a related-art permanent magnet motor.

Furthermore, if the shape of the open trapezoidal shaped permanent magnet in accordance with the fourth embodiment is formed in a V-shape as shown in FIG. 7, it is possible to obtain advantages similar to those of the fourth embodiment. This rotor is constructed such that a core portion 608, a V-shaped magnet portion 605, and a magnetic-field holding magnetic substance portion 606 inside the V-shaped portion are covered by an annular nonmagnetic material 607.

The open trapezoidal shaped, U-shaped, and V-shaped forms of the permanent magnets in accordance with the above-described fourth, fifth, and sixth embodiments are applicable to all the rotors which are arranged such that the magnetic-field holding magnetic substance portion is formed between the permanent magnet and the annular resilient material.

ADVANTAGES OF THE INVENTION

As described above, the permanent magnet motor in accordance with the invention is a permanent magnet motor in which a cylindrical rotor core is disposed on an inner side of a hollow cylindrical stator core around which coils are wound, magnetic-field holding portions are formed in the rotor core in such a manner as to extend in its axial direction, permanent-magnet insertion holes are formed such that the magnetic-field holding portions are disposed on the outer peripheral side of the rotor core, and permanent magnets are respectively inserted in the magnet insertion holes such that portions facing the magnetic-field holding magnetic material respectively assume same polarities, characterized in that the permanent magnets divided into a plurality of parts are respectively inserted into the insertion holes, and ribs are respectively provided in dividing portions. In addition, the permanent magnet motor is characterized in that the outer peripheral portion of the rotor core is covered by an annular resilient material, and the magnetic-field holding magnetic material portions are disposed in contact with this annular resilient material. By adopting the above-described construction, the magnetic flux density of the magnetic-field holding magnetic material portions can be increased to allow the rotor to obtain a large torque, and it is possible to alleviate the centrifugal force of the magnets and the like. Therefore, a large advantage is offered in that the rotor can be rotated in a high-rotation region.

What is claimed is:

1. A rotor for a permanent magnet motor, comprising:
   a rotor core main body;
   a plurality of magnetic-flux holding portions integral with the rotor core main body and arranged at a predetermined angular interval circumferentially with respect to the rotor core main body;
   a plurality of magnet insertion hole groups disposed in a single radial layer about a rotation axis of the rotor core main body, each group having at least three magnet insertion holes, each presenting a predetermined shape having end portions separated from each other, each group being disposed between a corresponding one of the magnetic-flux holding portions and the rotor core main body;

a plurality of outer peripheral connecting portions integral with the rotor core main body and magnetic-flux holding portions, each connecting portion connecting the rotor core main body to a corresponding one of the magnetic-flux holding portions at a position approximate a respective one of the end portions; and a plurality of ribs integral with the rotor core main body and magnetic-flux holding portions, each connecting the rotor core main body to a corresponding one of the magnetic-flux holding portions at a position within the predetermined shape, thereby each magnet insertion hole group includes at least two ribs thereby dividing each magnet insertion hole group into the at least three magnet insertion holes, wherein opposing side surface of adjacent magnets within each magnet insertion holes group are substantially parallel to each other.

2. The rotor of claim 1, wherein the predetermined shape includes one of an open trapezoidal shape, a V-shape and a U-shape.

3. The rotor of claim 2, wherein the at least two ribs of each magnet insertion hole group are disposed at respective corners of the open trapezoidal shape.

4. The rotor of claim 1, wherein the plurality of outer peripheral connecting portions and the plurality of ribs have substantially the same thickness.

5. The rotor of claim 1, wherein the plurality of outer peripheral connecting portions area of uniform thickness.

6. The rotor of claim 1, wherein the rotor core main body is formed by a single steel member.

7. The rotor of claim 1, wherein the rotor core main body is formed by multiple steel plates laminated together.

8. A rotor for a permanent magnet motor, comprising:

a rotor core main body;

a plurality of magnetic-flux holding portions integral with the rotor core main body and arranged at a predetermined angular interval circumferentially with respect to the rotor core main body;

a plurality of magnet insertion hole groups disposed in a single radial layer about a rotation axis of the rotor core main body, each group having at least three magnet insertion holes, each group generally being in the form of an open trapezoid having end portions separated from each other each group being disposed between a corresponding one of the magnetic-flux holding portions and the rotor core main body;

a plurality of outer peripheral connecting portions integral with the rotor core main body and the magnetic-flux holding portions, each connecting portion connecting the rotor core main body to a corresponding of the magnetic-flux holding portions at a position approximate a respective one of the end portions; and a plurality of ribs with the rotor core main body and magnetic-flux holding portions, each rib connecting the rotor core main body to a corresponding one of the magnetic-flux holding portions at a position within the open trapezoid, thereby each magnet insertion hole group includes at least two ribs thereby dividing each magnet insertion hole group into the at least three magnet insertion holes, wherein opposing side surfaces of adjacent magnets within each magnet insertion hole group are substantially parallel to each other.

9. The rotor of claim 8, wherein two ribs are disposed at respective corners of the open trapezoid, to thereby divide the magnet insertion hole group into the three magnet insertion holes.

10. The rotor of claim 8 wherein the plurality of outer peripheral connecting portions and the plurality of ribs have substantially the same thickness.

11. The rotor of claim 8 wherein the plurality of outer peripheral connecting portions are of uniform thickness.

12. The rotor of claim 8 wherein the rotor core main body is formed by a single steel member.

13. The rotor of claim 8 wherein the rotor core main body is formed by multiple steel plates laminated together.

14. The rotor of claim 8, wherein the at least two ribs of each magnet insertion hole group are disposed at respective corners of the open trapezoidal shape.

* * * * *